H. SCHULTDREES.
Improvement in Churns.
No. 114,050 — Patented April 25, 1871.
Fig. 3      Fig. 1      Fig. 4
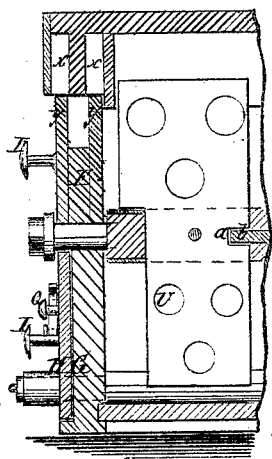 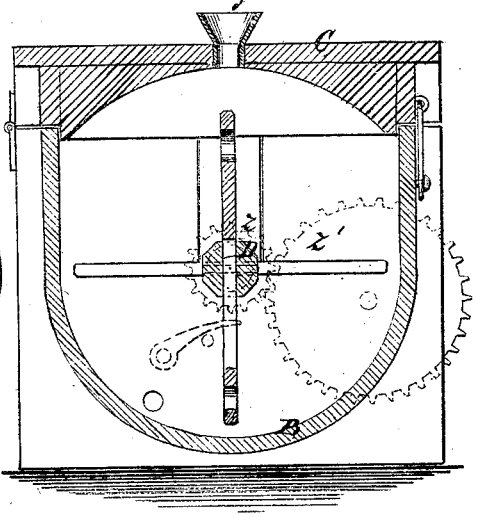 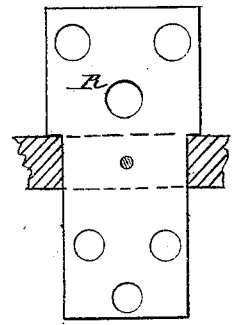
Fig. 2
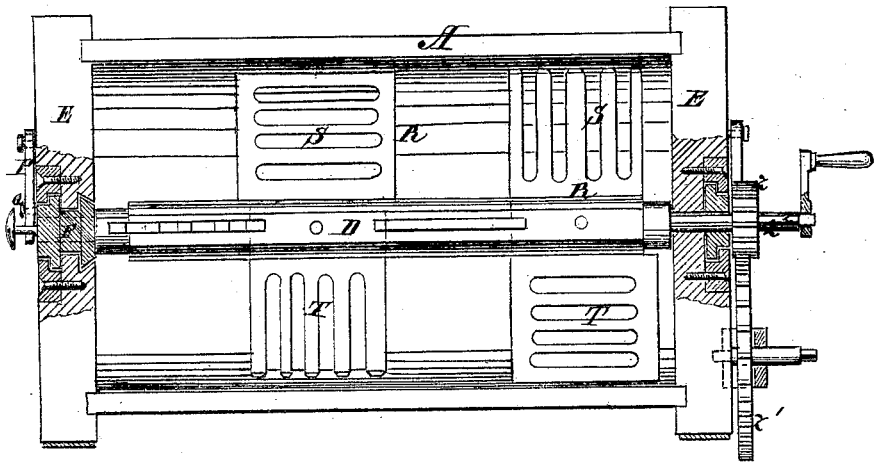
Witnesses:             Inventor:
C. Raettig            H. Schultdrees
Wm H. C. Smith      per 
                                     Attorneys.

United States Patent Office.

HENRI SCHÜLTDREES, OF BROOKVILLE, INDIANA.

Letters Patent No. 114,050, dated April 25, 1871.

IMPROVEMENT IN CHURNS.

The Schedule referred to in these Letters Patent and making part of the same.

*To all whom it may concern:*

Be it known that I, HENRI SCHÜLTDREES, of Brookville, in the county of Franklin and State of Indiana, have invented a new and improved Churn; and I do hereby declare that the following is a full, clear, and exact description thereof, which will enable others skilled in the art to make and use the same, reference being had to the accompanying drawing forming part of this specification.

This invention relates to improvements in churns for making butter, stirring ice-cream, or sponge for cake; and It consists in an arrangement for the bearing of a horizontal beater-shaft to be raised as the butter begins to form for gathering it, or as the sponge thickens for raising the shaft and supporting it in an elevated position.

Figure 1 is a transverse section of my improved churn;

Figure 2 is a horizontal section;

Figure 3 is a partial vertical section; and

Figure 4 is a section through the beater-shaft.

Similar letters of reference indicate corresponding parts.

A is a long rectangular case, with a concave bottom, B, and a hinged cover, C, in which is a horizontal dasher-shaft, D, extending from end to end and projecting through the end walls E.

I make vertical slots in these end walls from the top down to the bearings for the journals of the shaft, and fit therein the vertical slides F above the journals to close the slots, to prevent the cream from escaping.

Below the bearings I make vertical under-cut grooves in the outside of the end pieces, as shown at G, and fit the rim-slides H, for following the shaft upward when it rises to close the space between the shaft and its journal-bearings X in the end pieces.

The cover has mortises in the end piece to receive the parts Y of the slides when raised up.

Both the upper and lower slides have a finger-stud, I, for moving them.

K represents stop-catches, one of which is pivoted to each end piece a little above the finger-piece of the lower slide, with their free ends resting on studs Q, and so arranged that when these studs rise high enough to pass the ends after lifting them they will fall back upon their studs Q and receive the studs I, of the slides H, on their upper sides and hold said slides together with the beater-shaft in the elevated position required for gathering the butter, or by the thickened condition of the sponge.

The beaters I make of boards, R, either with the slots S or T, or with bored holes U, and insert them in mortises through the shaft, each alternate one of which is perpendicular to the other, and the end of one extends into the other, so that the beater being notched, as at $a$, to correspond with the part of the mortise for the next, crossing the mortise in which the said notched beater is placed, the edge $b$ of one beater will enter notch $a$ and lock the one in which the notch is made. In this way all the beaters will be locked in the shaft except the last, which may be pinned or otherwise fastened, and all may be pinned if preferred.

The beater-shaft has a pinion, Z, at one end, gearing with the large driving-wheel $Z^1$, to which the crank is applied when a rapid motion is required; but when the beater-shaft has been raised up and the pinion thereby becoming ungeared with wheel $Z^1$ the crank may be applied to the extension $Z^2$ of the shaft, provided for the purpose and fitted to receive it.

Having thus described my invention,

I claim as new and desire to secure by Letters Patent—

1. The combination, with the slotted and grooved end pieces of the case and the beater-shaft, of the slides F and H, substantially as specified.

2. The combination, with the slides H and finger-pieces I thereon, of the catch-levers P and pins Q, substantially as specified.

3. The arrangement of the vertically-adjustable beater-shaft D, pinion Z, driving-wheel $Z^1$, and extension $Z^2$ of the beater shaft, all substantially as specified.

4. The end pieces of the cover, having the mortises X arranged for receiving the ends of the slides F when raised, all substantially as specified.

HENRI SCHÜLTDREES.

Witnesses:
JOHN BURKHART,
JOSEPH STEEHR.